(12) United States Patent
Kydd

(10) Patent No.: US 8,360,184 B2
(45) Date of Patent: Jan. 29, 2013

(54) CONTROL SYSTEM FOR ELECTRIC HYBRID VEHICLE CONVERSION

(75) Inventor: Paul H Kydd, Lawrenceville, NJ (US)

(73) Assignee: Paul H. Kydd, Lawrenceville, NJ (US)

( * ) Notice: Subject to any disclaimer, the term of this patent is extended or adjusted under 35 U.S.C. 154(b) by 463 days.

(21) Appl. No.: 12/455,329

(22) Filed: Jun. 1, 2009

(65) Prior Publication Data
US 2010/0004807 A1    Jan. 7, 2010

Related U.S. Application Data

(60) Provisional application No. 61/078,428, filed on Jul. 6, 2008.

(51) Int. Cl.
*B60K 6/22* (2007.10)

(52) U.S. Cl. ............. 180/65.285; 180/65.265; 903/930; 903/904; 320/132; 477/3

(58) Field of Classification Search .............. 180/65.21, 180/65.25, 65.275, 65.265, 65.28, 65.285, 180/65.29; 903/930, 947, 902, 903, 904; 320/132; 477/3

See application file for complete search history.

(56) References Cited

U.S. PATENT DOCUMENTS

| | | | | |
|---|---|---|---|---|
| 5,293,947 | A * | 3/1994 | Stratton | 180/2.1 |
| 6,373,206 | B1 * | 4/2002 | Morimoto et al. | 318/139 |
| 7,121,234 | B2 * | 10/2006 | Schmitz et al. | 123/41.02 |
| 2006/0030450 | A1 | 2/2006 | Kyle | |
| 2007/0169970 | A1 | 7/2007 | Kydd | |
| 2007/0284164 | A1 | 12/2007 | Hamstra | |
| 2009/0000836 | A1 | 1/2009 | Kydd | |

* cited by examiner

*Primary Examiner* — Faye M Fleming
*Assistant Examiner* — Keith Frisby

(57) ABSTRACT

A control system is disclosed which permits operation of a Plug-in Hybrid IC-Electric Hybrid Vehicle (PHEV) in either parallel electric hybrid or IC modes with a single accelerator pedal. The operation of the electrical equipment is optimized to provide maximum electric power as long as the battery has useable capacity while being completely transparent to the driver. This control system is particularly suitable for converting an existing vehicle to a PHEV.

21 Claims, 5 Drawing Sheets

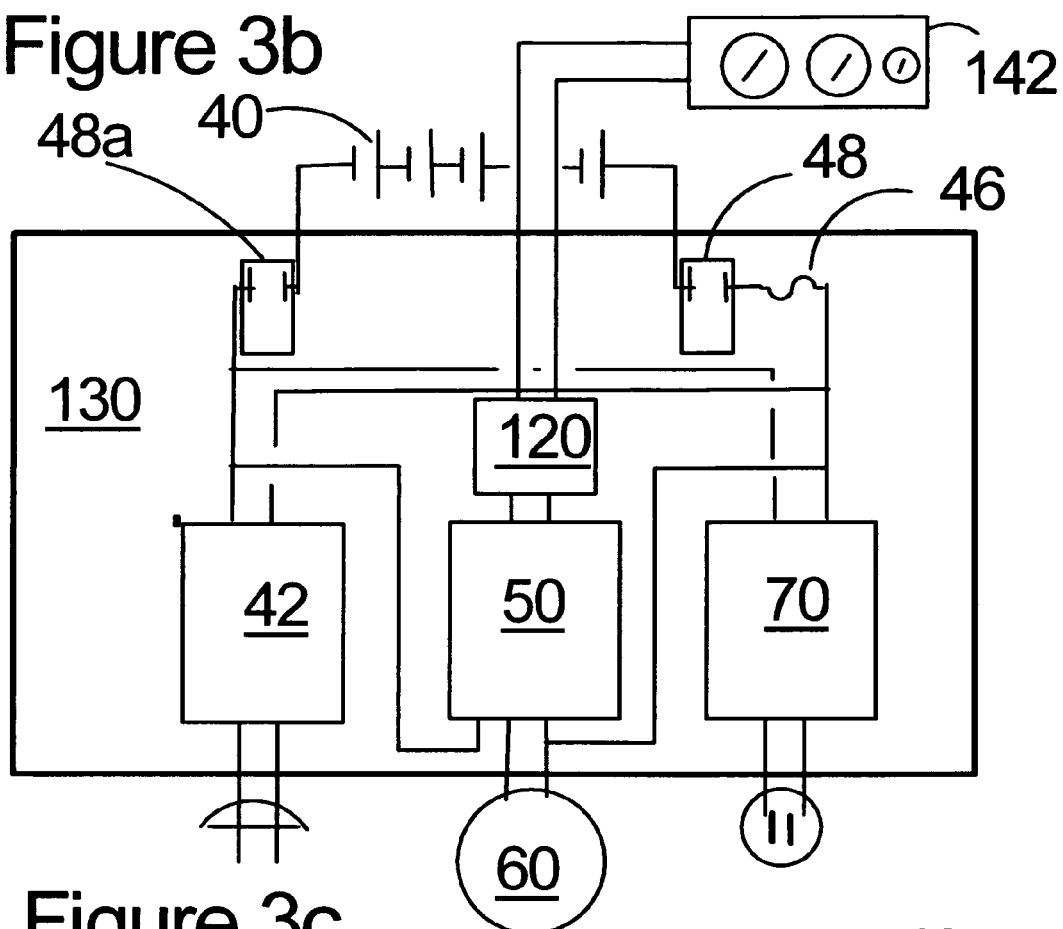
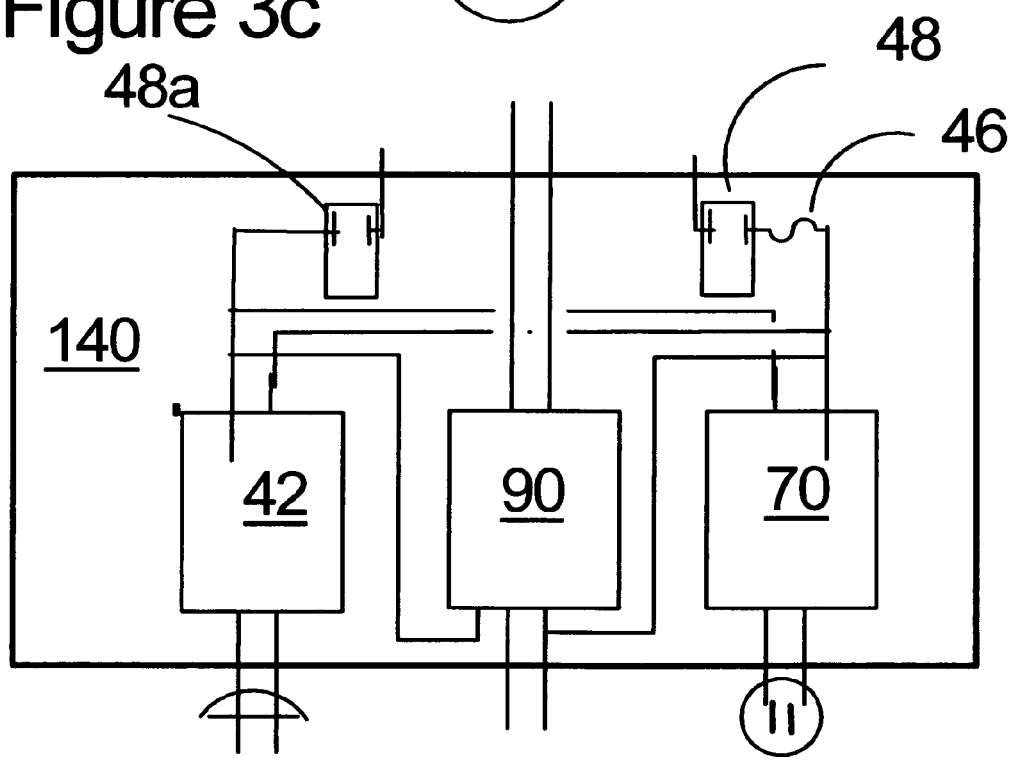

CONTROL SYSTEM FOR ELECTRIC HYBRID VEHICLE CONVERSION

CROSS-REFERENCE TO RELATED APPLICATIONS

This application claims the benefit of U.S. Provisional Patent Application Ser. No. 60/761,231 filed Jan. 23, 2006, embodied in U.S. Patent Application US2007/0169970 A1, filed Jan. 17, 2007, and of U.S. Provisional Patent Application Ser. No. 61/078,428, filed Jul. 6, 2008, all by the present inventor, the complete disclosure of which is hereby expressly incorporated by reference.

FEDERALLY SPONSORED RESEARCH

None

CITED LITERATURE

Kydd, Paul H. U.S. Patent Application US 2007/0169970 A1, Jan. 17, 2007
Kydd, Paul H. U.S. Patent Application US 2009/0000836 A1, Jun. 27, 2008
Kyle, Ronald L., U.S. Patent Application US 2006/0030450 A1, Feb. 9, 2006
Hamstra, George, Gehrs, Mel, U.S. Patent Application US 2007/0284164, Dec. 13, 2007

BACKGROUND OF THE INVENTION

This invention is broadly applicable to controlling one or more electric motors driving a motor vehicle. It has particular utility as it relates to a Plug-in Hybrid Electric Vehicle (PHEV), and specifically to conversion of existing Internal Combustion (IC) engine vehicles into PHEVs, as described in U.S. Patent Application US 2007/0169970 A1, filed Jul. 26, 2007 "Electric Hybrid Vehicle Conversion" and U.S. Patent Application US 2009/0000836 A1 filed Jun. 27, 2008 "Balanced Belt or Chain Drive for Electric Hybrid Vehicle Conversion". The function of this invention is to control one or more DC electric motors to propel a vehicle, either together with the existing IC engine as a parallel hybrid, or solely by electric power as a "strong hybrid".

Kyle in U.S. Patent Application US2006/0030450 A1, Feb. 9, 2006, discloses a conversion of a conventional IC engine vehicle to an IC-electric hybrid vehicle with a control system having inputs of vehicle speed, throttle position, engine speed and electric motor speed to perform a complicated control operation on the electric motor, but with no details of how this is to be accomplished.

Hamstra and Gehrs in U.S. Patent Application US2007/0284164, Dec. 13, 2007, disclose a control system similar to the one of this invention but operated in an entirely different way due to the limitations of the motor they employ.

It is an objective of this invention to maximize the contribution from an electric storage battery to propelling a vehicle. It does this by using the electrical propulsion system to provide its maximum contribution until the storage battery is exhausted. Series wound traction motors are particularly good at starting heavy loads from a standing start and continuing to propel them up to high speeds without the need for shifting gear ratios, as is required by an IC engine with its limited operating speed range. The control system of this invention facilitates operating the electric motor in this mode, while maintaining operation of the IC engine as a back up to provide reversing in those cases when the electric motors are not electrically reversible, to drive the auxiliaries such as air conditioning, power steering and power brakes, and to provide 12 Volt battery charging. The IC engine is also available to provide extra power for acceleration and hill climbing and additional range when the batteries are exhausted.

It is an additional objective of this invention to sense when the batteries are exhausted and to prevent excessive current drain which will shorten their life.

It is yet another objective to provide a driver interface for a vehicle converted into a plug hybrid by the teachings of U.S. Patent Application US2007/0169970 A1, Jul. 26, 2007, which provides a driving experience substantially the same as before the vehicle was converted, so that the boost from the electrical system is transparent to the driver. The vehicle is operated in the same way whether electric power is available or not.

BRIEF SUMMARY OF THE INVENTION

An electric accelerator pedal activating an electric control element or switch provides the driver interface with the control system. This pedal is mounted on or interacts with the accelerator pedal of the IC vehicle in such a way that the electric drive is fully engaged before the IC engine throttle is opened.

The control system includes a Pulse Width Modulated (PWM) current limiter or motor controller which takes a signal from the electric accelerator pedal and applies DC electric power from the electric storage battery to the electric motors to drive the vehicle. The current limiter provides maximum power to the motors while limiting the current drain from the batteries to preserve their life.

A Programmable Logic Controller (PLC) is programmed to provide power to the PWM controller when all of the input parameters to the PLC are correct, and to interrupt power to the controller when conditions are not correct, as for example when the brakes are engaged, the clutch is depressed, the vehicle is in reverse or the battery reaches a specified degree of discharge.

BRIEF DESCRIPTION OF THE DRAWINGS

FIG. 3b is a schematic of a prewired unit comprising the control system of this invention in a single unit.

FIG. 3c is a schematic of the prewired unit with an alternative current limiter-motor controller.

DETAILED DESCRIPTION OF THE INVENTION

The Preferred Embodiment

Figure 1:
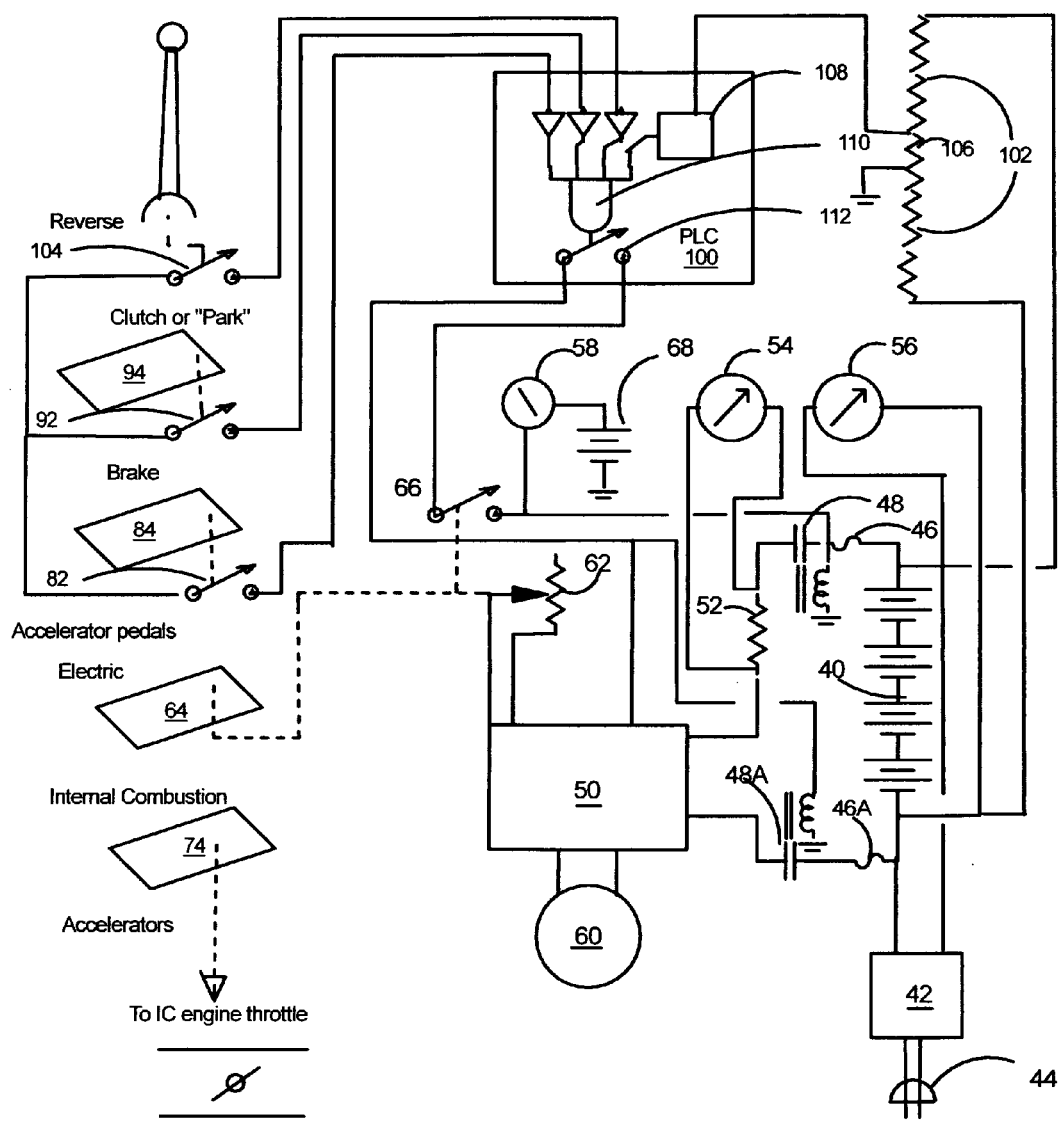
FIG. 1 is a schematic view of the major components of the control system of this invention.

In FIG. 1 a PWM controller or current limiter 50 provides electric power from storage battery 40 to electric motor or motors 60.

Storage battery 40 may be any type of rechargeable (secondary) battery including flooded lead-acid, gelled lead-acid, AGM lead-acid, nickel-cadmium, nickel-metal hydride, nickel-sodium chloride (Zebra), sodium-sulfur, lithium-polymer or lithium-ion batteries. It should have adequate capacity to propel the vehicle for 10 to 40 miles, typically 10 to 20 kWh of storage, and adequate voltage to provide acceptable performance, typically at least 120 V and preferably 144 V. For example, twelve U27-12XP lithium-ion batteries from Valence Technology, Inc. Austin, Tex., would provide 130 Ah (104 Ah useable) at 154 V or 16 kWh of useable energy.

Electric power is supplied to recharge battery 40 through charger 42 from plug 44 which may preferably be energized by widely available 120V or 240 V single phase AC power. For example the Zivan NG3 3 kW switching charger available from Electric Conversions, Sacramento, Calif., is light enough and small enough to carry on board the vehicle.

DC power is drawn from storage battery 40 through 300 Ampere fuses 46 and 46A and contactors such as the Curtis/Albright SW-200 48 and 48A to controller 50. Controller 50 may be a pulse width modulation controller for a DC motor such as the Curtis 1231C-8601 from Curtis PMC, Livermore, Calif. This controller can provide up to 500 amps at up to 144 V. The controller has potentiometer controls to limit the battery current and the ramp rate if desired. A more suitable controller would provide for regenerative braking, which will be described below. More modern controllers such as the Zilla provide for limiting both the battery and motor current, which is desirable.

Current to the controller 50 is monitored by shunt 52 and ammeter 54 to guide the driver as to the amount of power being used. The battery voltage is monitored by voltmeter 56 to provide information on the state of charge of the battery. Either or both of these functions may be performed by a more sophisticated electronic battery management system that can provide additional functions in monitoring battery state of charge and the charging process as well.

Primary contactor 48 is energized by 12 V from the existing ignition switch 58 of the vehicle and existing 12 V battery 68. The speed of the electric motor is typically governed by a variable resistance signal provided by potentiometer 62 actuated by a separate accelerator pedal, 64. Pedal 64 also actuates microswitch 66 which provides 12 V power to controller 50 and secondary contactor 48A via a relay in PLC 100 to provide power to motor(s) 60 only when electric operation is intended. Other controllers use alternative electronic control elements instead of potentiometer 62 such as 0-5 V voltage signals, optical encoders and Hall effect devices to provide an operator input to the controller.

Motor 60 is preferably a series-wound DC traction motor, as for example the FB1 9" diameter, 25 HP motor from Advanced DC Motors, Inc. of Syracuse, N.Y. Series-wound motors are particularly suitable in this application because of their characteristic production of maximum starting torque at low speeds. Unexpectedly, I have found that two series-wound motors may be driven from a single PWM controller. If one motor for some reason has a lower reverse EMF than the other due to a lower speed or a lower magnetic field, more current will flow to it increasing the field, the torque and the back EMF for a stable response. I have been successful operating two Advanced DC X91-4003 motors from a single 1231C controller.

Figure 1A:
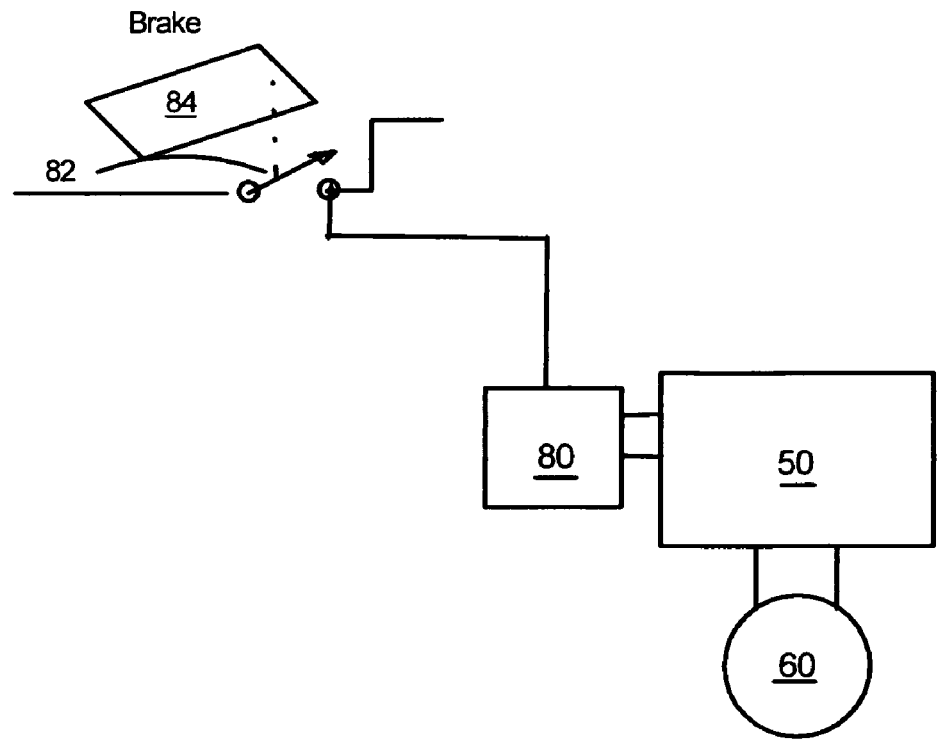
FIG. 1a is a view of an optional regenerative braking control.

An optional regenerative brake accessory 80 in FIG. 1a is actuated by existing brake pedal 84 and brake light switch 82 to augment the existing hydraulic brake system, particularly at high speeds and on long down grades to improve the energy efficiency of the vehicle. This function may be incorporated in the controller, as described below.

Figure 1B:
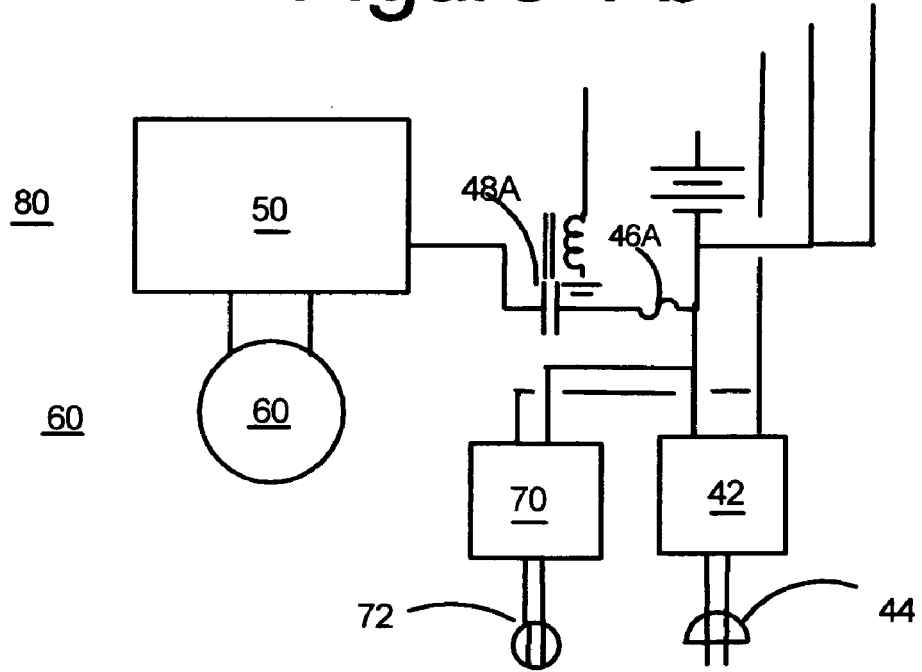
FIG. 1b is a schematic view of an optional inverter for taking power from the control system and for vehicle-to-grid applications.

Another option is to take power from the vehicle battery for operating tools or recreation equipment in locations where AC power is not available or in case of emergency. Inverter 70 in FIG. 1b can convert DC power from battery 40 back to single or three-phase power to supply receptacle 72.

In FIG. 1 electric accelerator pedal 64 is located adjacent to internal combustion accelerator pedal 74 in such a way that the electric pedal and the associated potentiometer or other electronic control element 62 are fully engaged before IC accelerator pedal begins to open the throttle of the IC engine. This may be accomplished by locating a "pot box" containing both potentiometer 62 and microswitch 66 such as the Curtis FP-6 with a side mounted aluminum pedal adjacent to the existing IC accelerator pedal such that the FP-6 pedal is above the IC accelerator and overlapping it. In this way the FP-6 pedal is contacted by the driver's foot first. The microswitch 66 is closed and the potentiometer 62 run up to 5000 ohms before the IC engine throttle begins to open. This ensures that the electric motor delivers its full power to the vehicle before the IC engine is called upon.

The same result may be achieved by mounting the pot box directly on the IC engine accelerator pedal. The Curtis FP-2 is a flat assembly that is squeezed to operate the electric motor. If it is mounted on the IC engine accelerator pedal with a suitable choice of spring constants, the driver's foot contacts the FP-2 and the electric system is run up to full power before the IC engine throttle opens. If the electric system is inhibited by PLC 100, the IC engine drives the vehicle as before conversion based on the position of the IC engine accelerator pedal 74 and ignoring electric pedal 64.

PLC 100 acts to inhibit electric system operation except when it is permissible and desired. A controller such as the Crozet Millennium 3+CD12 with four digital inputs, 4 analog inputs and 4 relay outputs is suitable. The conditions under which electric system operation is not permissible are:

When the vehicle is in reverse and the IC engine and the electric motors are in conflict. Alternatively this conflict could be resolved by using an electric reversing relay for the electric motors driven by the same +12 V signal from the transmission reverse light switch 104 on the vehicle that is used to inhibit electric operation for non reversing motor installations.

When the brakes are applied, in which case a +12 V signal is available from brake light switch 92. Again this signal could be used to activate the regenerative braking unit 80 in FIG. 1a or a regenerative braking option in more elaborate conversions which are so equipped, but in this case the controller 50 should still be shut down or switched to reverse mode.

When clutch 94 in FIG. 1 is depressed in standard shift vehicles or when the transmission is in "Park" in automatic transmission vehicles. The reason for this is that it is desirable to allow the driver to use the IC accelerator pedal while starting and warming up the IC engine without having the electric drive engaged.

When the battery 40 is nearing discharge. It is desirable to terminate electric operation well before the electric storage battery is completely exhausted to prevent damage to the cells and to prolong battery life. Typically a limit of 80% depth of discharge is recommended. This can be detected by the fact that the battery internal impedance increases with discharge, and the battery voltage begins to sag under load. The rest voltage at no load is also an indicator of battery capacity. Typically this is limited to no less than 1.75 V per cell for lead-acid batteries.

Twelve volt signals are generated by switches 82, 92 and 104, for conditions of brakes applied, clutch depressed/park selected or reverse selected. These signals are applied to digital inputs 1, 2, 3 of controller 100 and inverted to logical negatives.

Main propulsion battery 40 voltage is monitored via voltage divider 102. The purpose of this voltage divider is to provide a voltage signal to controller 100 which is proportional to the voltage of battery 40 and referenced to the vehicle ground without imposing an excessive current drain on battery 40, and without providing a low resistance leakage path to the vehicle ground from battery 40 which could be a safety hazard. Typically it is desirable to keep the current drain and the leakage current to the vehicle chassis to less than 1 mA. For a 144 V battery pack this requires a total resistance in each arm of the voltage divider 102 of 144 k ohms. Providing a voltage signal characteristic of a single cell relative to the vehicle ground then requires a resistance of 4 k ohms in the center section 106 of voltage divider 102, (including the input impedance of the analog to digital converter in controller 100).

Figure 2:
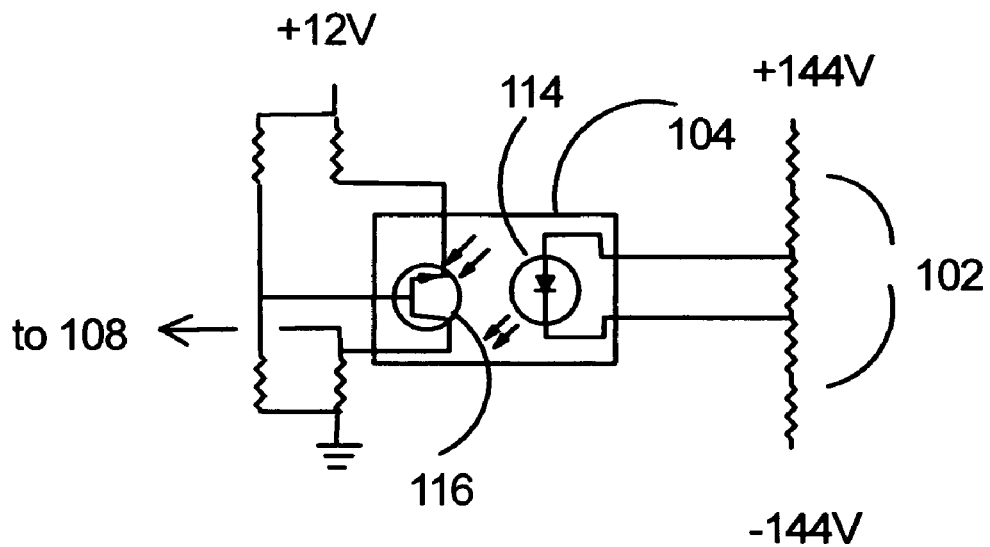
FIG. 2 is a schematic view of an optical isolator to permit sampling the battery voltage without connecting the electric storage battery to the vehicle ground.

A better alternative is to couple the voltage signal from voltage divider 102 to the PLC input by an optical isolator 104 as shown in FIG. 2. A photodiode 114-photo transistor 116 such as the 4N25 is suitable for this service. In this way a voltage can be applied to the controller which is referenced to the vehicle ground while leaving the battery 40 isolated from ground for safety.

Figure 2A:
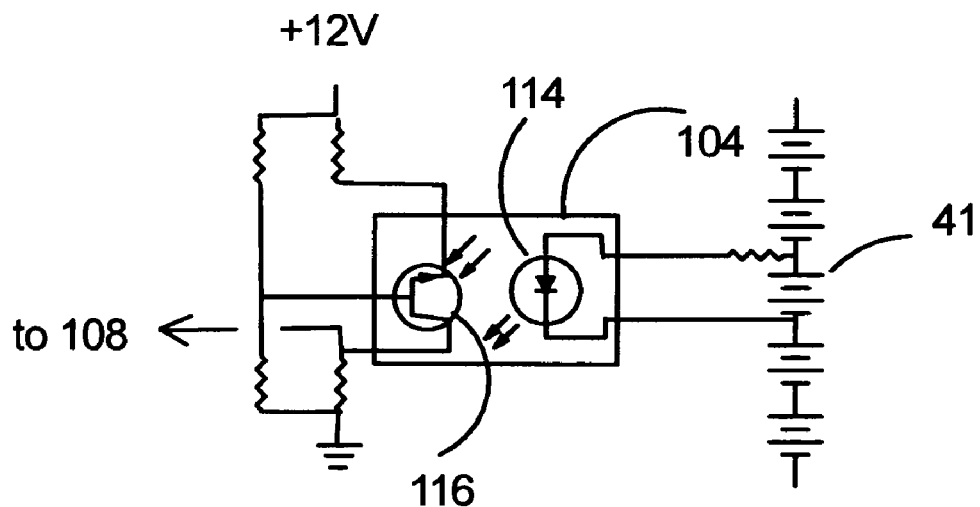
FIG. 2a is a schematic view of sampling an individual battery via an optical isolator to assess the condition of the entire battery pack.

A less desirable, but simpler approach is to sample the voltage of a single battery 41 through an optical isolator as representative of the entire battery pack as shown in FIG. 2a.

The voltage signal from voltage divider 102 in FIG. 1 is compared to a preset value in controller 100 to inhibit electrical operation when the battery pack cannot supply the required energy. This is manifested by the pack voltage dropping below a critical value under load or remaining under a critical value at rest. A typical lead-acid cell voltage under load would be 1.66V. The limiting rest voltage is 1.75 V. The controller 100 should be programmed to produce a negative signal from comparator 108 if the input signal drops below 1.66 V or if it stays below 1.75 V for more than some period, typically three seconds. Once this condition occurs, controller 100 should be programmed to latch relay 112 open until the battery is recharged to a higher voltage, typically 2.0 V per cell.

The negative signals from the digital inputs and the analog comparator are summed in an and gate 110 and used to operate relay 112. Relay 112 is in series with microswitch 66 and will inhibit operation of the controller 50 until the vehicle is not in reverse, not being braked, the clutch is not depressed in a standard shift vehicle and the battery is not exhausted. If all of these conditions are fulfilled, the vehicle will operate under electric power until one of the conditions is violated.

Unexpectedly I have found that for the full sized pickup trucks and SUVs, which are the primary targets for conversion to PHEVs, the electric motors are required to deliver their maximum power almost all the time, and the performance at low speeds with a conventional PWM controller is very poor.

The potentiometer 62 could be eliminated and a simple switch 66, mounted on the IC engine accelerator pedal, could be used to turn the electric drive on and off through contactor 48A. However, it is still desirable to limit the current drawn from the battery, because a heavy vehicle at low speed can impose an excessive load which reduces useable battery capacity and ultimately shortens battery life. For this purpose a current limiter circuit performing the function of controller 50 is desirable. This can be provided as shown in FIG. 3.

Figure 3:
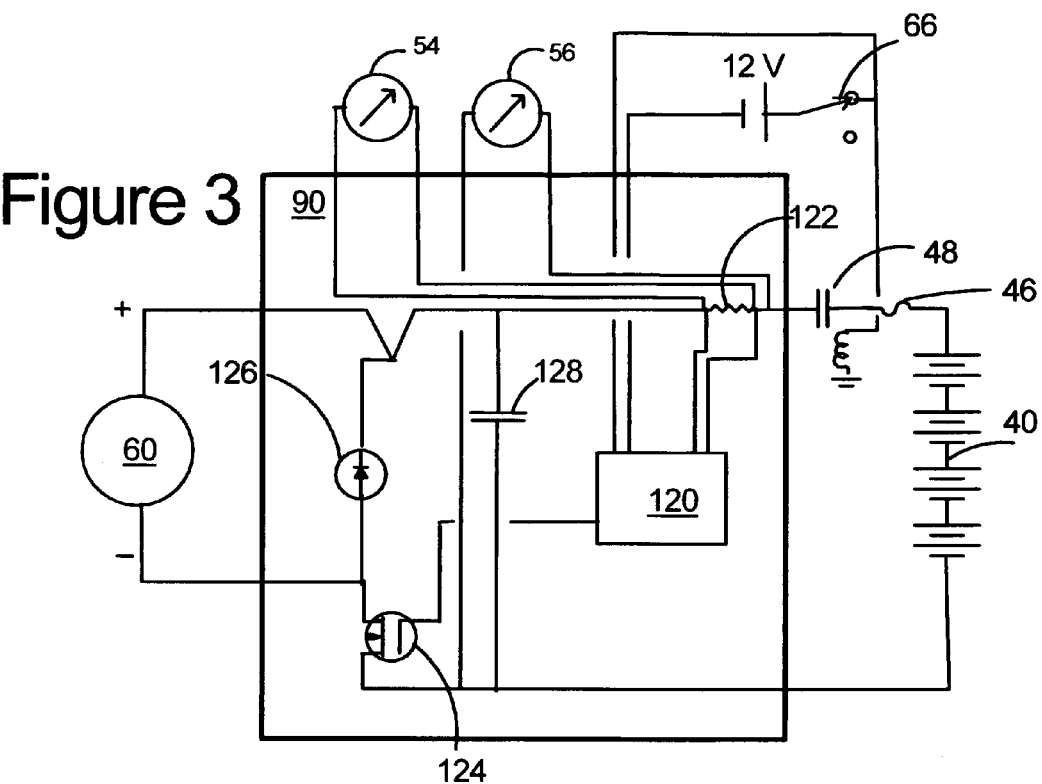
FIG. 3 is a schematic of a PWM input current limiter to provide maximum current to the motors while limiting the battery drain rate.

In FIG. 3 Battery 40 is connected to controller 90 through contactor 48 and fuse 46 as before. Shunt 122 produces a voltage signal proportional to input current. This signal is fed to embedded computer 120 to control the input current by pulse width modulation of the control system output. Embedded computer 120 may also perform all the functions of PLC 100 in FIG. 1. For example the Rabbit LP 3500 Fox computer has 16 digital inputs and 8 analog inputs as well as relay outputs and a PWM driver output. It can accept resistance or voltage input to output a PWM signal to drive power semiconductors 124 in FIG. 3 controlling the series wound motors 60, as well as accepting all of the digital and analog inputs of the PLC to open contactor 48 in case of battery exhaustion, brake application, etc.

Power transistors 124 will be in parallel to handle the high currents required for motors 60. They may be power MOSFETs as shown, or Insulated Gate Bipolar Transistors (IGBITs) or a combination of both. They accept a series of gate pulses from embedded computer 120 at a frequency of approximately 10 kHz which are modulated in width to limit the input current to a preset value, typically 250 Amperes. They output a square wave voltage, whose average is lower than the input voltage, and a current which can be greater than the input current. This is possible because freewheeling diodes 126, also in parallel, maintain the current through the motor nearly constant despite the varying voltage output of transistors 124. In contrast, the input voltage is constant and the input current from transistors 124 varies. Capacitors 128, also in parallel, maintain nearly constant current from the battery, as sensed by shunt 122.

Current limiter 90 thus functions as a current transformer, similar to other PWM controllers. At low motor speeds, when the reverse EMF from motor(s) 60 is low, the limiter 90 reduces average voltage on the motors to limit input current and battery drain, but allows motor currents several-fold higher than the input current to provide adequate torque to accelerate the vehicle from standstill. This preserves the advantage of series wound motors in being able to start heavy loads with modest power drain. As the speed builds up, the motor voltage will increase and the current will decrease until at maximum speed, typically 65 miles per hour, the computer 120 is providing a constant gate signal to transistors 124 which are on all the time. By this means the battery is providing constant power over the entire speed range while the motor(s) are providing their maximum torque at all speeds.

Figure 3A:
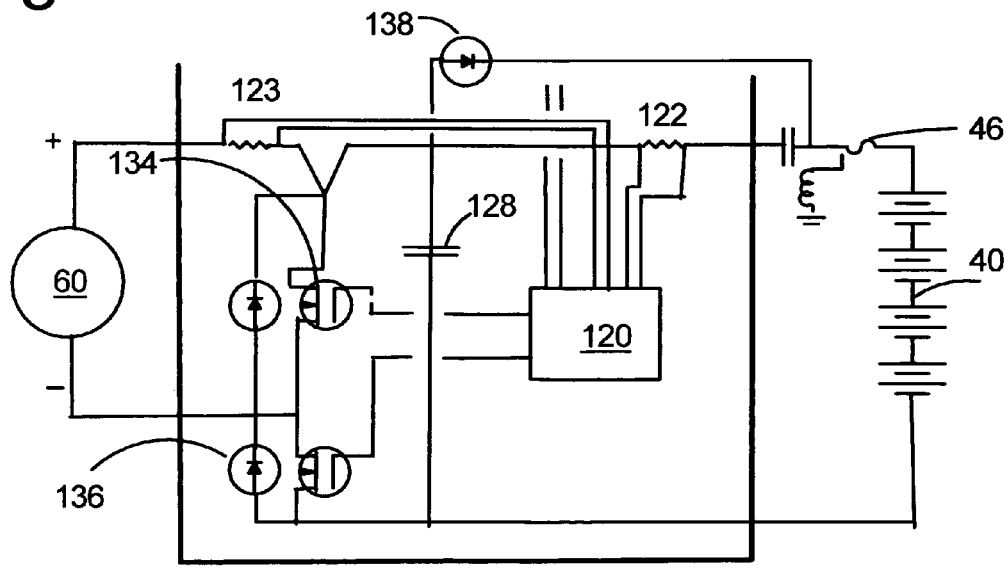
FIG. 3a is a schematic of a regenerative braking option for the input current limiter shown in FIG. 3.

An optional regenerative braking option can be added to controller 90 by including power transistors 134 and diodes 136, both in parallel as shown in FIG. 3a. A signal from the vehicle brake light switch or simply from releasing the accelerator pedal and turning on the NC side of switch 66 can turn off transistors 124 and output a pulse train to transistors 134 which periodically short circuit motors 60. When the current sensed by shunt 123 reaches a preset level on each pulse the short circuit is interrupted and a large voltage builds up across motors 60, which can feed a pulse of power back into battery 40 via diodes 136 and 138. When the reverse current falls to zero, the process is repeated until the motors are turning too slowly to generate the required voltage, and the motors are continually short circuited. Pressing on the accelerator shuts off the regeneration function of limiter 90 and enables the current limiting function to accelerate the vehicle.

All of the components of current limiter 90, including embedded computer 120 may be packaged as a prewired unit In a single enclosure as suggested by the heavy outline in FIGS. 3 and 3a. Battery 40, motor 60 and instrumentation package 142 are in separate locations. The entire control system of this invention may similarly be packaged as a prewired unit in a single enclosure as shown in FIG. 3b with controller 50 and in FIG. 3c with current limiter 90.

EXAMPLE 1

A 1986 Chevrolet S-10 pickup truck was converted to a plug-in hybrid by the teachings of U.S. Patent Application US2007/0169970 A1 and U.S. patent application Ser. No. 12/163,496 filed Jun. 27, 2008. The vehicle was modified according to the teachings of the present invention. Two Advanced DC X91-4001 motors were linked to the drive shaft by a timing belt and an overrunning clutch. The motors were powered by twelve Exide Industrial Group 24 AGM batteries through a Curtis 1231-8600 controller with a pot box mounted next to the IC engine accelerator such that the driver's foot depressed the electrical accelerator pedal before contacting the IC accelerator pedal. A Crozet Millenium 3+CD 12 PLC in series with the microswitch on the pot box provided the functions of PLC 100. This was a standard shift vehicle and switch 94 was added to sense depressing the clutch pedal. The vehicle could be started by depressing the clutch and operating the IC engine throttle in the usual way. In reverse the electric system was turned off by reverse light switch 104 and PLC 100. The vehicle was accelerated through the gears in the usual way with the electric system providing the maximum torque permitted by setting the current limiter on PWM controller 50 to 225 Amps. Additional power could be supplied by pressing harder on the accelerator to generate IC engine power as needed. At full speed the transmission was left in neutral and the vehicle was powered solely by electric power with the IC engine providing auxiliary power for the accessories. If added power was needed for acceleration or hill climbing, the vehicle was shifted into the appropriate gear and driven on both electric and IC power. When the battery voltage began to sag as the battery capacity neared exhaustion, PLC 100 shut off the electric power leaving the trip to be completed on IC power. This vehicle completed a competition involving a simulated 25 mile commuting trip over public roads with a 20% saving in fuel consumption.

EXAMPLE 2

The control system of this invention was installed in a Ford F-150 pickup truck. Two Advanced DC X91-4001 motors were mounted rigidly on angle iron cross members running between the frame rails of the truck. The motors are powered by twelve Exide Industrial Group 27 AGM batteries through a Curtis 1231-8600 controller with a pot box mounted behind the IC engine accelerator such that the driver's foot depresses the electrical accelerator pedal before contacting the IC accelerator pedal. A Crozet Millenium 3+CD 12 PLC in series with the microswitch on the pot box accepts digital inputs from the brakes reverse and clutch and a 6 V analog input from a series of resistors totaling 288 k ohms across the main battery pack. The truck has covered several thousand miles after conversion both with and without electric assist. The truck had a fuel mileage of 18 miles per gallon prior to conversion. After conversion it has been variously measured at 24 to 30 mpg.

Specific embodiments of the method and apparatus for controlling a hybrid electric vehicle have been described to illustrate the manner in which the invention is made and used. Other variations and modifications of the invention will be apparent to those skilled in the art, and the invention is not limited to the specific embodiments described. Therefore it is contemplated to cover the present invention and any and all modifications, variations or equivalents which fall within the spirit and scope of the principles disclosed and claimed herein.

I claim:

1. An electrical control system for a plug-in Internal Combustion (IC)-electric hybrid vehicle comprising:
    A current limiting electric motor controller,
    A Programmable Logic Controller (PLC) with at least three digital and one analog inputs and at least one relay output
    Switches providing digital input to the PLC,
    Means to provide an analog input to the PLC proportional to the battery state of charge,
    A control element linked to an IC engine accelerator pedal of the vehicle to provide an acceleration signal to the electric motor controller during an accelerator input from the driver.

2. The control system in claim 1 in which the control element is operated by a pedal which overlaps an IC engine accelerator pedal such that one or more electric motor(s) brought to full load before an IC engine throttle opens.

3. The control system in claim 1 in which the control element is located on top of an IC engine accelerator pedal such that one or more electric motor(s) is brought to full load before an IC engine throttle opens.

4. The control system in claim 1 in which the PLC output relay operates in series with the control element on the accelerator pedal to interrupt power to the electric motor controller when the PLC inputs indicate that the vehicle is reversing, a clutch pedal on a standard shift vehicle is depressed or an automatic transmission is in "Park", or that a battery state of charge is too low.

5. The control system in claim 1 in which the PLC digital inputs include 12 V relative to vehicle ground from the brake light switch and from the reverse light switch of the vehicle and from a switch on the clutch pedal of a standard shift vehicle when the clutch pedal is depressed or from a switch on the transmission of an automatic transmission vehicle when the transmission is in "Park".

6. The control system in claim 1 in which the analog input is transmitted from a voltage divider to the PLC via an optical isolator to isolate a battery supply from vehicle ground.

7. The control system in claim 1 in which the analog input is taken from one battery as a sample of an entire series of batteries.

8. The control system in claim 1 in which an analog battery voltage signal is compared to a standard value by the PLC and in which a battery voltage below a preset limit for rest voltage persisting for a preset time results in a logical negative signal which interrupts power to the electric motor controller.

9. The control system in claim 1 in which an analog battery voltage signal is compared to a standard value by the PLC and in which a battery voltage below a preset limit for instantaneous voltage results in a logical negative signal which interrupts power to the electric motor controller.

10. The control system in claim 1 in which a negative logical signal generated by the PLC resulting from low battery voltage is latched, rendering the electrical control system nonfunctional until a battery is charged to above a preset voltage.

11. The control system in claim 1 in which positive signals from the digital inputs are converted to negative logic signals, and in which the logic signals from the digital and analog inputs are summed in an and gate to produce a signal closing the output relay and powering the electric motor controller when all four logic inputs are positive and opening the output relay to inhibit or terminate electric operation when any one of the four logic signals goes negative.

12. The control system in claim 1 in which the electric motor controller is a commercially available DC motor controller and the accelerator pedal control element is a pot box providing a variable resistance output and an on-off output enabling variable power output from one or more electric motor(s) with current limiting on the output of the controller.

13. The control system in claim 1 in which the electric motor controller limits the input current from the battery.

14. The electrical control system in claim 1 in which the accelerator pedal switch control element is a simple on-off switch, and the electric motor controller functions only as a battery current limiter.

15. The electrical control system in claim 1 which includes a regenerative braking function and in which the regenerative braking function is initiated by the control element on the accelerator pedal.

16. The electrical control system in claim 1 which includes a regenerative braking function, and in which the regenerative braking function is initiated by a control element on a brake pedal.

17. The electrical control system in claim 1 in which the electric motor controller and the PLC are supplied as a single unit.

18. The electrical control system in claim 1 in which the electric motor controller and the PLC, together with a battery charger, as well as contactors, fuses and other electrical and electronic parts are supplied as a prewired unit in a single enclosure to permit ready conversion of existing vehicles to Plug-in Hybrid Electric Vehicles.

19. The method of converting an existing vehicle into a PHEV by installing the control system of claim 1 with suitable drive components, batteries, wiring and instrumentation.

20. The electrical control system in claim 1 in which the electric motor controller and the PLC, together with a battery charger and an inverter to provide AC output power from the DC battery pack and to enable Vehicle-to-grid (V2G) operation, as well as contactors, fuses and other electrical and electronic parts are supplied as a prewired unit in a single enclosure to permit ready conversion of existing vehicles to Plug-in Hybrid Electric Vehicles.

21. The vehicle converted to a Plug-in Hybrid Electric Vehicle by the method of claim 19.

* * * * *